May 7, 1963   T. F. STIRGWOLT ETAL   3,088,694
WING-FAN DOORS
Filed Dec. 29, 1960
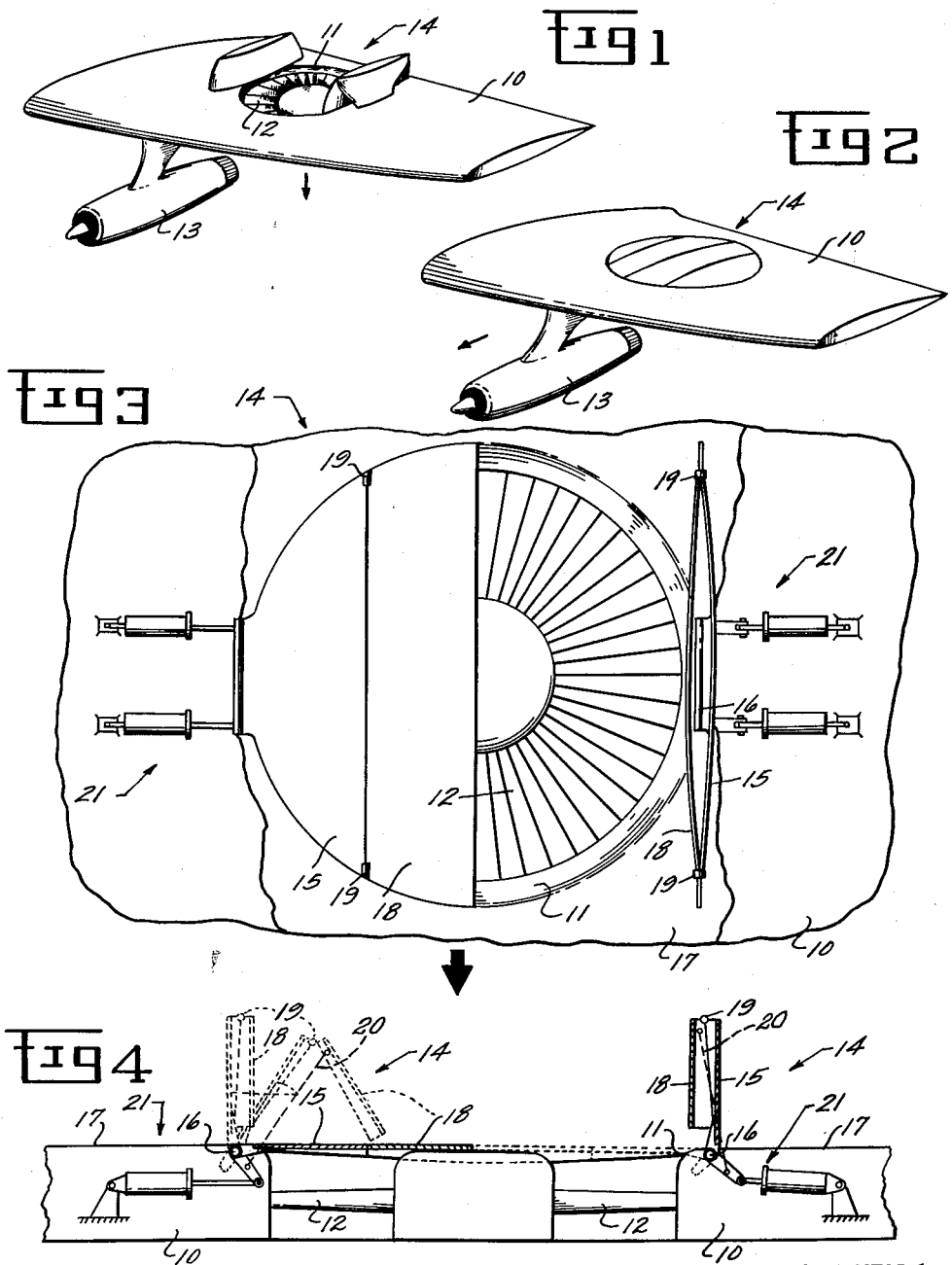
INVENTORS:
TED F. STIRGWOLT
DENIS P. EDKINS
BY
John F. Cullen
ATTORNEY

United States Patent Office 3,088,694
Patented May 7, 1963

3,088,694
WING-FAN DOORS
Ted Floyd Stirgwolt, Marblehead, and Denis Pierpoint Edkins, Lynnfield, Mass., assignors to General Electric Company, a corporation of New York
Filed Dec. 29, 1960, Ser. No. 79,420
8 Claims. (Cl. 244—12)

The present invention relates to wing-fan doors and, more particularly, to door structure in combination with the wing-fan structure for VTO aircraft.

In VTO—vertical take-off—aircraft one of the common concepts under active consideration is the wing-fan type of aircraft. In such aircraft, fans are mounted flat in the wing structure to move large quantities of low pressure air from the top of the wing and discharge the air downwardly in order to create vertical lift. The fans may be, and usually are, driven by tip turbines consisting of turbine blades mounted upon the periphery of the fan or the fan may be gear driven directly by the powerplant. Such arrangements, must provide for some means of closing off the fan when the aircraft is operating horizontally. Thus, when the aircraft is operating horizontally a smooth structure, conforming to the surface of the wing, is desired in order to achieve the necessary lift and reduce drag that would be present if the fan ducts were not covered.

The above structure, as thus far described, is presently well known. In aircraft of the conventional type, such as fixed wing structures, it has been proposed to provide slidable covers in order to cover the fan during horizontal operation. However, the use of such slidable covers requires some means of stowage in the wing which presents difficulties because of the thinness of the wings normally used as well as the supporting structure necessary to carry a slidable door. Furthermore, when in the open position, the fan draws in air from above the wing and spanwise across the wing to reduce lift on the wing.

Another means of closing the fan opening has been the use of louvers similar to those used in the exit on the lower surface of the wing. However, these also do not prevent the suction of air spanwise of the wing and the resulting loss of lift and, in addition, because of their very nature, present an obstruction to the free flow of air into the fan from above the wing.

The main object of the present invention is to provide a wing fan structure for such aircraft which includes a door arrangement for closing the fan opening which has minimum deleterious effects on the operation of the aircraft.

A further object is to provide such a wing fan structure with doors which, by their construction, act as a fence to avoid the spanwise suction of air across the wings.

Another object is to provide such structure which presents minimum drag to the operation of the aircraft when the fan is in operation.

Briefly stated, the invention is directed to a wing-fan structure for a fixed horizontal wing of a VTO aircraft wherein the wing has an opening through it and a lift fan is disposed within the opening. Vertically opening doors are provided in the wing structure to close over the opening and form a continuation of the upper surface of the wing and to open in a direction that aligns them with the flow of the main air across the wing to act as a fence to prevent the suction of air spanwise of the wing through the fan. The doors are two part doors oppositely disposed next to the opening and aligned as stated, each part of the door on each side of the opening consisting of a two piece door hinged together so that the pieces abut when the door is in open position and move into a flat position to form a continuation of the wing surface when the doors are closed.

While the specification concludes with claims particularly pointing out and distinctly claiming the subject matter which we regard as our invention, it is believed the invention will be better understood from the following description taken in connection with the accompanying drawing in which:

FIGURE 1 is a partial perspective view showing the doors and their alignment in the open position;

FIGURE 2 is a partial perspective view showing the doors in the closed position;

FIGURE 3 is a plan view showing the relation of the doors to the fan, each door being in a different position; and FIGURE 4 is a partial elevation view in section illustrating diagrammatically the operation of the doors in relation to the fan wing structure.

Referring first to FIGURE 1, there is shown a fixed horizontal wing structure 10 which may form a part of a VTO aircraft, not completely shown, with the usual fuselage attached at the left end of the wing 10. For vertical lift, wing 10 has a fan opening 11 therein in which is disposed a fan 12 to move large quantities of low pressure air in the vertical direction as illustrated for vertical lift. Horizontal flight is obtained by the use of conventional jet engines 13. Foldable doors, generally indicated at 14 and to be described, are disposed on each side of opening 11 and are effectively used mainly during the transition period from vertical rising to horizontal flight or vice versa. Thus, FIGURE 1 represents an aircraft that is vertically rising or descending or in the transition period and jet engines 13 may be operating mainly for driving fan 12.

Referring next to FIGURE 2, the same structure is shown wherein the wing is now part of an aircraft moving horizontally at high speed. In this position doors 14 are closed to form a continuation of the upper surface of the wing 10 and jet engines 13 are propelling the aircraft.

Referring now to FIGURES 3 and 4, the details and alignment of the door structure will be apparent. Since the showing is intended as diagrammatic only to illustrate the essential operation, specific design details are omitted for clarity. It can be seen that each door 14 is disposed on diametrically opposite sides of opening 11 and only one side need be described. This door structure, as shown in FIGURE 4, includes a first door 15 that is mounted for rotation on a first axially extending hinge 16 which hinge is disposed in wing member 10 below the upper surface 17. First hinge 16 is aligned, as shown in FIGURE 3, so that its axis of rotation is disposed substantially parallel to the direction of the main airflow across the upper surface of the wing as shown by the arrow. In order to close the substantially circular fan opening 11, door 15 will be formed to correspond to the opening and will have a circular segment shape as shown in the closed position at the left in FIGURE 3. To complete the closing of the fan opening, a second door 18 is mounted on second hinge 19 carried by the first door on the door edge opposite the first hinge 16. It can be seen that a folding of doors 15 and 18 brings them into abutting relation in the open position so the door structure folds upon itself as shown in the right hand portion of FIGURE 4. For this closing operation, it will be apparent that hinge 19 is aligned with hinge 16 and the second door 18 when in the closed position as shown in the left in FIGURE 3, forms an extension of door 15. The doors are designed and formed to fit flush into the fan opening in order to form a smooth continuation of the wing upper surface 17 as shown in FIGURE 2. Any suitable actuating means, for example, a conventional linkage system 20 such as a 4-bar linkage and a hydraulic actuator generally indicated at 21, may be used to open and close the doors. It should be noted that the actuating means forms no part of this invention and is generally disclosed merely to indicate a mode of operation of the doors.

In order to prevent drag on both the aircraft and the doors themselves, the doors are also formed, as shown on the right in FIGURE 3, to present a substantially airfoil shape in cross-section along the hinge axes. In addition, as can be seen in the folded position of the doors in FIGURE 4 at the right, each door 14 forms a fence between the fan opening and the adjacent wing surface 17. This prevents the spanwise movement of air into the fan opening and across the wing surface when wing lift is required during the transition period. With such movement prevented, the normal lift on the wing due to the movement of air across it is not impaired.

It can also be seen that the folded door arrangement permits each door 14 to form a half circle when closed over its half of the fan opening 11. By providing folding door members 15 and 18, the vertical extent of the door in the open position is not large and a consequent sail effect is avoided which would increase the difficulty in control of the aircraft so it is desired to keep the doors relatively low in the open position.

Any suitable door structure operating in the manner disclosed may be used and may consist of thin light weight structure suitably formed to provide the structural rigidity necessary.

The advantages of the door structure just described include; the avoidance of spanwise motion of air across the wing to impair lift and this is accomplished by the alignment of the doors; the foldable feature of the doors in order to prevent a large vertical sail in the open position; and the flush arrangement of the doors with the hinge structure 16 in the closed position to form a continuation of the upper wing surface 17 for lift during forward operation. It can be seen that this structure requires a minimum amount of support and disturbance of the adjacent wing member to maintain the wing member integral.

While we have hereinbefore described a preferred form of our invention, obviously many modifications and variations of the present invention are possible in the light of the above teachings. It is therefore to be understood that within the scope of the appended claims, the invention may be practiced otherwise than as specifically described.

We claim:

1. Wing-fan structure for VTO aircraft comprising, a fixed horizontal wing member for the aircraft having an upper surface thereon, said surface having an opening with a fan disposed therein for the movement of air downwardly therethrough, hinge means disposed on opposite sides of said opening and connected to said wing member, the axis of rotation of said hinge means being aligned substantially parallel to the main airflow across said upper surface, a door mounted on each hinge for rotation toward and away from said wing surface, each door extending over half the opening when closed to continue said wing surface over said opening.

2. Wing-fan structure for VTO aircraft comprising, a fixed horizontal wing member for the aircraft having an upper surface thereon, said surface having an opening with a fan disposed therein for the movement of air downwardly therethrough, a pair of hinges, each hinge being mounted in the upper surface of the wing member with its axis of rotation disposed substantially parallel to the main airflow across said upper surface and on the opposite side of said opening from the other hinge, a door mounted on each hinge for rotation into a vertical position above said wing surface when open and into the wing surface closing said opening, each door spanning half the opening to continue said wing surface over said opening.

3. Apparatus as described in claim 2 wherein said opening is substantially circular and said doors are formed half circles when in closed position.

4. Wing-fan structure for VTO aircraft comprising, a fixed horizontal wing member for the aircraft having an upper surface thereon, said surface having a substantially circular opening with a fan disposed therein for the movement of air downwardly therethrough, a first axially extending hinge disposed in the wing member below the wing surface, said hinge axis of rotation disposed substantially parallel to the main airflow across said upper surface, a second similar hinge disposed diametrically opposite said first and similarly aligned, a door mounted on each hinge for rotation above said surface into a vertical position when open and into the wing surface covering said opening when closed to form a continuation of said surface, each door being formed into a half circle.

5. Apparatus as described in claim 4 wherein each door is formed in two parts hinged together to fold upon itself in the open position.

6. Apparatus as described in claim 4 wherein each door is formed into a substantially airfoil shape in cross section along said hinge axis.

7. Apparatus as described in claim 4 wherein each door is formed in two parts hinged together and in alignment with said hinge in the wing member to fold upon itself in the open position and said door is formed into a substantially airfoil shape in cross section along both said hinge axes.

8. Wing-fan structure for VTO aircraft comprising, a fixed horizontal wing member for the aircraft having an upper surface thereon, said surface having a substantially circular opening with a fan disposed therein for the movement of air downwardly therethrough, a first axially extending hinge disposed in the wing member below the wing surface, said hinge axis of rotation being disposed substantially parallel to the direction of main airflow across said upper surface, a door structure including a first door mounted for rotation on said hinge into a vertical open and horizontal closed position, a second hinge aligned with the first on said door edge opposite said first hinge, a second door mounted on said second hinge for movement into abutting relation with said first door in open position and forming an extension of said first door in closed position, said first and second doors being formed to present an airfoil section in open position and to cover half said opening in closed position, said door structure being duplicated on the diametrically opposite side of said opening whereby in closed position said door structures form a smooth continuation of said wing surface, and means connected to said doors to move them to open and closed positions.

References Cited in the file of this patent

UNITED STATES PATENTS

| | | |
|---|---|---|
| 2,001,400 | Shamberger | May 14, 1935 |
| 2,736,514 | Ross | Feb. 28, 1956 |
| 2,803,414 | Haggins | Aug. 20, 1957 |

FOREIGN PATENTS

| | | |
|---|---|---|
| 325,200 | Italy | Mar. 4, 1935 |